United States Patent
Wu et al.

(10) Patent No.: US 10,146,364 B2
(45) Date of Patent: Dec. 4, 2018

(54) TOUCH PAD INPUT DEVICE

(71) Applicant: PRIMAX ELECTRONICS LTD., Taipei (TW)

(72) Inventors: Tung-Heng Wu, Taipei (TW); Ying-Che Tseng, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 110 days.

(21) Appl. No.: 15/258,738

(22) Filed: Sep. 7, 2016

(65) Prior Publication Data

US 2017/0371476 A1    Dec. 28, 2017

(30) Foreign Application Priority Data

Jun. 24, 2016 (TW) .............................. 105119946 A

(51) Int. Cl.
*G06F 3/041* (2006.01)
*G06F 3/0354* (2013.01)

(52) U.S. Cl.
CPC ........ *G06F 3/0416* (2013.01); *G06F 3/03547* (2013.01); *G06F 3/0412* (2013.01)

(58) Field of Classification Search
CPC .......................... G06F 3/03547; G06F 3/0416
See application file for complete search history.

(56) References Cited

U.S. PATENT DOCUMENTS

| | | | |
|---|---|---|---|
| 2007/0132742 A1* | 6/2007 | Chen ..................... | G06F 3/0428 345/175 |
| 2015/0253933 A1* | 9/2015 | Lu ......................... | G06F 3/0428 345/175 |

* cited by examiner

*Primary Examiner* — Chun-Nan Lin
(74) *Attorney, Agent, or Firm* — Kirton McConkie; Evan R. Witt

(57) ABSTRACT

An input device includes a plate body, a first sensing element, a second sensing element and a control unit. The first sensing element and the second sensing element are respectively located at two ends of a diagonal of the plate body for sensing a first image and a second image corresponding to a touching object. The control unit is electrically connected with the first sensing element and the second sensing element. The control unit acquires a position characteristic value according to the first image and acquires an auxiliary position characteristic value according to the second image. Moreover, the control units recognizes a position of the touching object according to the position characteristic value and the auxiliary position characteristic value, and generates an output signal according to the position of the touching object.

8 Claims, 7 Drawing Sheets

|   | 7 | 6 | 5 | 4 | 3 | 2 | 1 | 0 |   |
|---|---|---|---|---|---|---|---|---|---|
|   | $\frac{P4}{8}$ | $\frac{P4}{7}$ | $\frac{P4}{6}$ | $\frac{P4}{5}$ | $\frac{P4}{4}$ | $\frac{P4}{3}$ | $\frac{P4}{2}$ | P4 | 0 |
|   | $\frac{P4}{16}$ | $\frac{P4}{14}$ | $\frac{P4}{12}$ | $\frac{P4}{10}$ | $\frac{P4}{8}$ | $\frac{P4}{6}$ | $\frac{P4}{4}$ | $\frac{P4}{2}$ | 1 |
|   | $\frac{P4}{24}$ | $\frac{P4}{21}$ | $\frac{P4}{18}$ | $\frac{P4}{15}$ | $\frac{P4}{12}$ | $\frac{P4}{9}$ | $\frac{P4}{6}$ | $\frac{P4}{3}$ | 2 |
|   | $\frac{P4}{32}$ | $\frac{P4}{28}$ | $\frac{P4}{24}$ | $\frac{P4}{20}$ | $\frac{P4}{16}$ | $\frac{P4}{12}$ | $\frac{P4}{8}$ | $\frac{P4}{4}$ | 3 |
|   | $\frac{P4}{40}$ | $\frac{P4}{35}$ | $\frac{P4}{30}$ | $\frac{P4}{25}$ | $\frac{P4}{20}$ | $\frac{P4}{15}$ | $\frac{P4}{10}$ | $\frac{P4}{5}$ | 4 |
|   | $\frac{P4}{48}$ | $\frac{P4}{42}$ | $\frac{P4}{36}$ | $\frac{P4}{30}$ | $\frac{P4}{24}$ | $\frac{P4}{18}$ | $\frac{P4}{12}$ | $\frac{P4}{6}$ | 5 |

FIG.9

TOUCH PAD INPUT DEVICE

FIELD OF THE INVENTION

The present invention relates to an input system, and more particularly to an input system including a touch pad.

BACKGROUND OF THE INVENTION

The widely-used peripheral input device of a computer system includes for example a mouse device, a keyboard device, a trackball device, or the like. With the progress of the times, a touch pad has been introduced into the market. By directly using the user's fingers or using a touch pen to operate the touch pad, the computer system or other appropriate electronic device can be correspondingly controlled.

The subject of the present disclosure is related to a touch pad. Nowadays, the commercially available touch pads are classified into several types, including a resistive touch pad, an acoustic wave touch pad, an infrared touch pad and a capacitive touch pad. The operating principles of these touch pads will be shortly illustrated. When a pressing object (e.g. the user's finger) is placed on the resistive touch pad, a voltage change is generated and the pressing position is recognized according to the voltage change. Moreover, acoustic waves pass over the surface of the acoustic wave touch pad. By touching the surface of the acoustic wave touch pad, the travelling path of the acoustic wave is blocked by the pressing object and thus the position of the pressing point is recognized. The operating principles of the infrared touch pad are similar to those of the acoustic wave touch pad. That is, infrared rays pass over the surface of the infrared touch pad. By touching the surface of the infrared touch pad, the travelling path of the infrared rays is blocked by the pressing object and thus the position of the pressing point is recognized. When the user's finger is contacted with the capacitive touch pad, the capacitance value of the touch point of the capacitive touch pad is subjected to a change. According to the change of the capacitance value, the position of the touch point is recognized.

Regardless of which touch pad is selected, it is necessary to install plural X-axis sensing lines and plural Y-axis sensing lines in the touch pad for detection. The plural X-axis sensing lines and plural Y-axis sensing lines intersect with each other to define plural switches. That is, one switch is defined by one X-axis sensing line and one Y-axis sensing line. When a touching action on the touch pad with the user's finger or the touch pen is detected, the corresponding switch is triggered to generate a touch signal. Generally, as the number of the sensing lines increases, the detecting precision increases. However, the increased number of the sensing lines increases the fabricating cost of the touch pad.

Therefore, there is a need of providing an input device with high precision and low fabricating cost.

SUMMARY OF THE INVENTION

An object of the present invention provides an input device with high precision and low fabricating cost.

In accordance with an aspect of the present invention, there is provided an input device. The input device includes a plate body, a first sensing element, a second sensing element and a control unit. The first sensing element is disposed on the plate body and located at a first end of a diagonal of the plate body. The first sensing element detects a first image corresponding to a touching object on/over the plate body. The second sensing element is disposed on the plate body and located at a second end of the diagonal of the plate body. The second sensing element detects a second image corresponding to the touching object on/over the plate body. The control unit is electrically connected with the first sensing element and the second sensing element. The control unit acquires a position characteristic value according to the first image and acquires an auxiliary position characteristic value according to the second image. Moreover, the control units recognizes a position of the touching object according to the position characteristic value and the auxiliary position characteristic value and generates an output signal according to the position of the touching object.

From the above descriptions, the input device of the present invention uses two sensing elements to establish two coordinate systems on the plate body. Moreover, the second coordinate system can assist the control unit in recognizing the position of the first coordinate of the first coordinate system. Consequently, the possibility of misjudging the position of the touching object is minimized. In comparison with the conventional input device using plural high-density sensing lines, the input device of the present invention has reduced fabricating cost and still has the desired precision of recognizing the position of the touching object.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 9 schematically illustrates a fourth coordinate system of the input device according to an embodiment of the present invention.

DETAILED DESCRIPTION OF THE PREFERRED EMBODIMENT

For solving the drawbacks of the conventional technologies, the present invention provides an input device.

Figure 1:
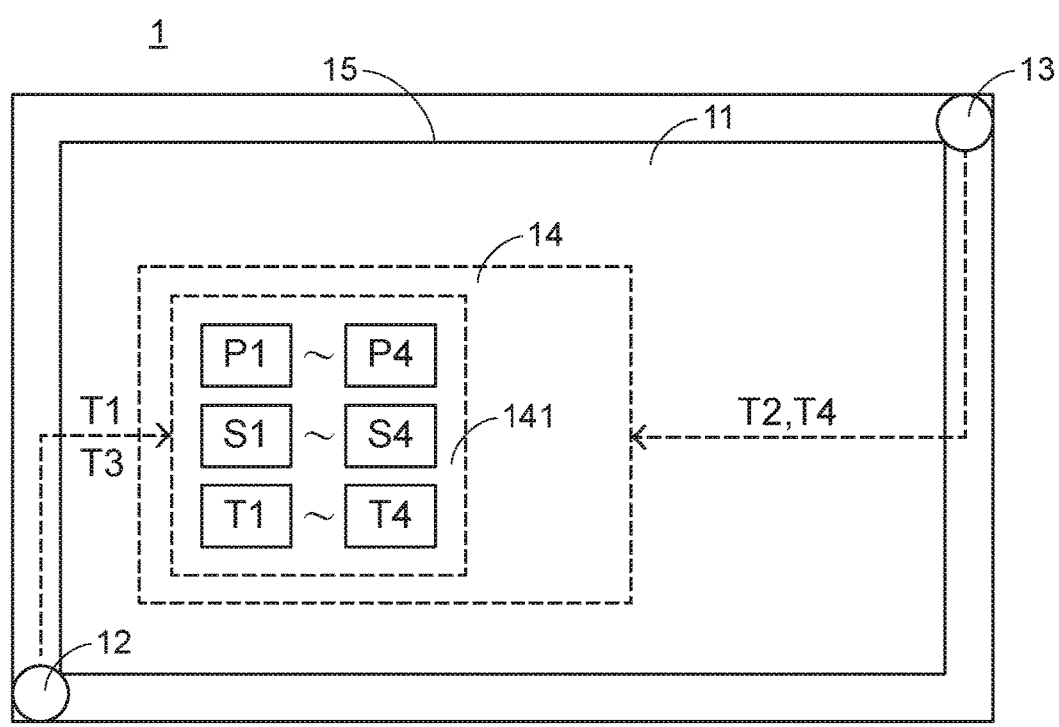
FIG. 1 schematically illustrates an input device according to an embodiment of the present invention.

The architecture of an input device of the present invention will be illustrated as follows. FIG. 1 schematically illustrates an input device according to an embodiment of the present invention. The input device 1 is used for controlling an electronic device that is in communication of the input device 1. For example, the electronic device is a computer that is externally connected with the input device 1, or the electronic device is a handheld device with the input device 1. An example of the handheld device includes but is not limited to a smart phone, a tablet computer or a personal digital assistant (PDA). In an embodiment, the input device 1 comprises a plate body 11, a first sensing element 12, a second sensing element 13, a control unit 14 and a prompt unit 15.

The plate body 11 is exposed outside the input device 1. Moreover, the user can use a touching object 10 (see FIG. 5) to touch a top surface of the plate body 11 to perform a corresponding operation. The first sensing element 12 is disposed on the plate body 11 and located at a first end of a diagonal of the plate body 11.

The first sensing element 12 is used for detecting a first image T1 of the touching object 10 that is placed on the top surface of the plate body 11 or over the plate body 11. The second sensing element 13 is disposed on the plate body 11 and located at a second end of the diagonal of the plate body 11. The second sensing element 13 is used for detecting a second image T2 of the touching object 10 that is placed on the top surface of the plate body 11 or over the plate body 11. That is, except for the shooting angle, the size of the touching object 10 and the position of the touching object 10, the contents of the first image T1 and the contents of the second image T2 are substantially identical. In an embodiment, the first sensing element 12 and the second sensing element 13 are charge coupled devices (CCD) or complementary metal-oxide semiconductors (CMOS), and the touching object 10 is the user's finger.

As shown in FIG. 1, the control unit 14 is electrically connected with the first sensing element 12, the second sensing element 13 and the prompt unit 15. The control unit 14 has four functions. In accordance with a first function, the control unit 14 analyzes the first image T1 and the second image T2 to acquire a position characteristic value and an auxiliary position characteristic value. The position characteristic value is a parameter associated with the position of the touching object 10 (see FIG. 5) in the first image T1. The auxiliary position characteristic value is a parameter associated with the position of the touching object 10 in the second image T2. In accordance with the second function, the control unit 14 judges the position of the touching object 10 according to at least one of the position characteristic value and the auxiliary position characteristic value, and issues a touch signal according to the position of the touching object 10. In accordance with the third function, the control unit 14 enables the prompt unit 15. In accordance with the fourth function, the control unit 14 creates a database 141. The function of creating the database 141 will be described later. In an embodiment, the control unit 14 is a microprocessor.

The prompt unit 15 is electrically connected with the control unit 14 and exposed outside the plate body 11. The prompt unit 15 is used for outputting a prompt message M to be watched or listened by the user (see FIG. 7). Preferably but not exclusively, the prompt unit 15 is a built-in display device or a built-in sound output device that is disposed within the input device. Alternatively, in another embodiment, the prompt unit 15 is an external display device or an external sound output device that is connected with the input device.

The contents of the first image T1 will be described as follows. When the touching object 10 is placed on the plate body 11, a circle image corresponding to the touching object 10 is formed on the plate body 11. Then, the first sensing element 12 captures the scene of the plate body 11 to acquire the first image T1 including the circle image. The first image T1 contains a first object information corresponding to the touching object 10, a first size P1 corresponding to the touching object 10 (i.e., the size of the circle image) and the position characteristic value corresponding to the touching object 10. The object information corresponding to the touching object 10 includes the type and the brightness value of the touching object 10. For example, if the brightness value of the circle image is low, the control unit 14 judges that the touching object 10 is a nonluminous touching object such as a user's finger or an ordinary pen. Whereas, if the brightness value of the circle image is high, the control unit 14 judges that the touching object 10 is a luminous touching object. For example, the luminous touching object is a touch pen with a light source. The contents of the second image T2 are similar to the contents of the first image T1. For example, the second image T2 contains the first object information corresponding to the touching object 10, a second size P2 corresponding to the touching object 10 (i.e., the size of the circle image) and the auxiliary position characteristic value corresponding to the touching object 10.

Figure 2:
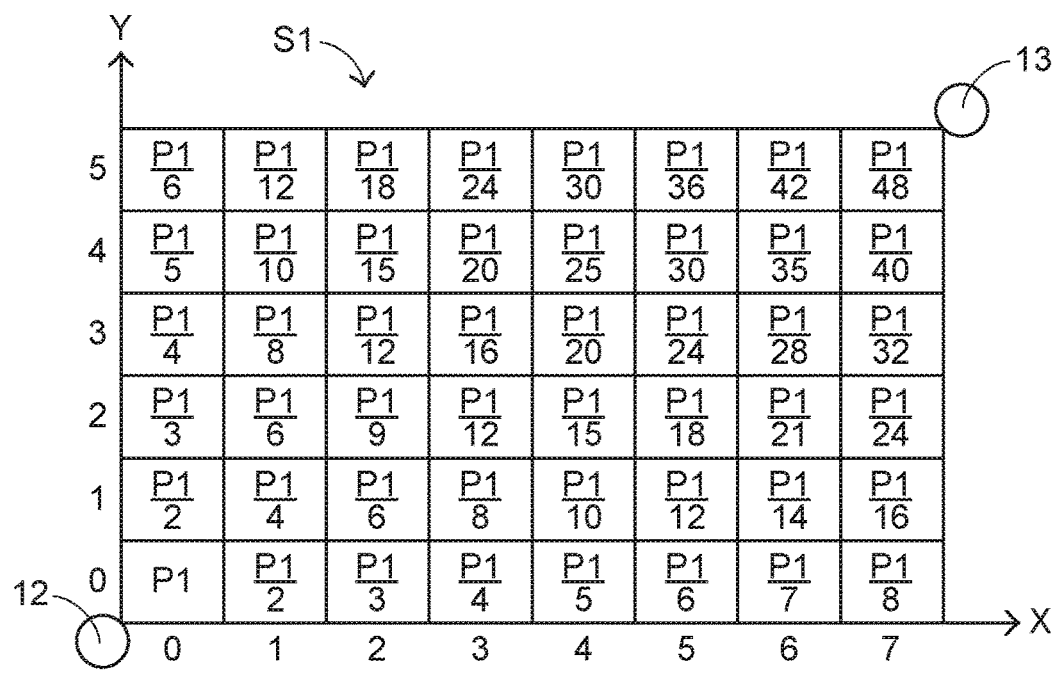
FIG. 2 schematically illustrates a first coordinate system of the input device according to an embodiment of the present invention.
Figure 3:
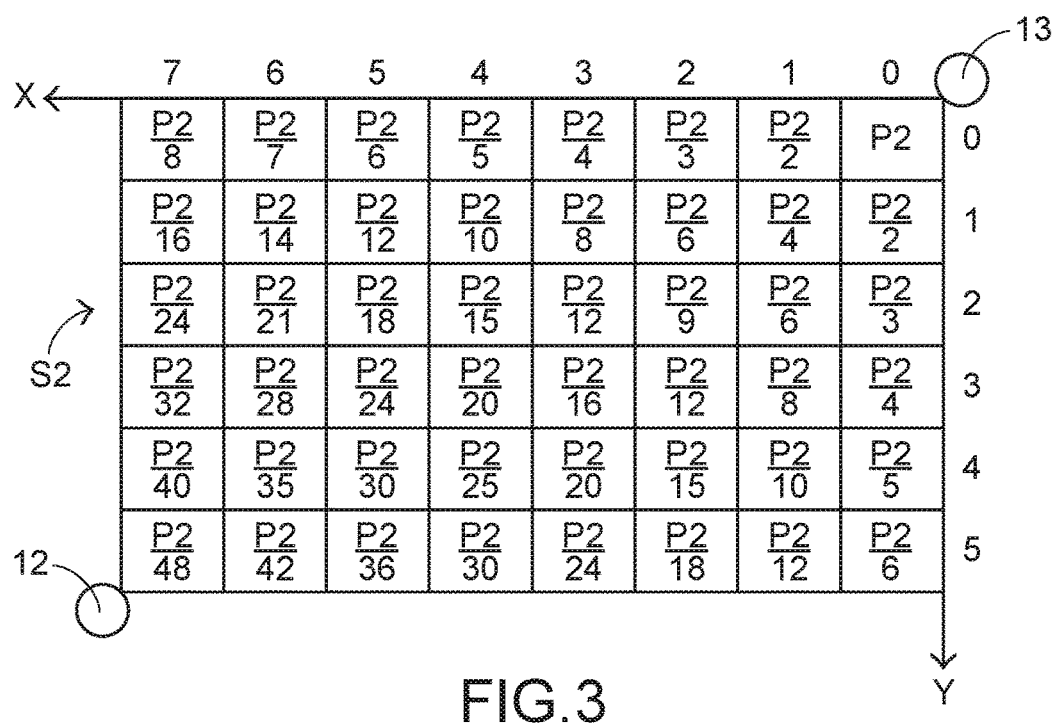
FIG. 3 schematically illustrates a second coordinate system of the input device according to an embodiment of the present invention.

Please refer to FIGS. 1, 2 and 3. FIG. 2 schematically illustrates a first coordinate system of the input device according to an embodiment of the present invention. FIG. 3 schematically illustrates a second coordinate system of the input device according to an embodiment of the present invention. The control unit 14 defines plural first coordinates of the plate body 11 with respect to the first sensing element 12. The plural first coordinates are collaboratively formed as a first coordinate system S1 with respect to the first sensing element 12. As shown in FIG. 2, the first coordinate system S1 is defined by an X axis and a Y axis. The first coordinate that is the closest to the first sensing element 12 is (0, 0). Similarly, the control unit 14 defines plural second coordinates of the plate body 11 with respect to the second sensing element 13. The plural second coordinates are collaboratively formed as a second coordinate system S2 with respect to the second sensing element 13. As shown in FIG. 3, the second coordinate system S2 is also defined by an X axis and a Y axis. The second coordinate that is the closest to the second sensing element 13 is (0, 0). In the first coordinate system S1 and the second coordinate system S2, the X-axis scale is 8 and the Y-axis scale is 6. It is noted that the X-axis scale and the Y-axis scale are not restricted.

As shown in FIGS. 2 and 3, the position of the first coordinate (0, 0) in the first coordinate system S1 and the second coordinate (7, 5) in the second coordinate system S2 are identical. However, a first predetermined position characteristic value corresponding to the first coordinate (0, 0) and a second predetermined position characteristic value corresponding to the second coordinate (7, 5) are different.

The first and second predetermined position characteristic values are acquired by the control unit 14 according to the touching object 10 on/over the plate body 11. For example, when the touching object 10 is placed on the position of the first coordinate (0, 0), a circle image corresponding to the touching object 10 is formed on the plate body 11. Then, the first sensing element 12 captures the scene of the plate body 11 to acquire the first image T1 including the circle image. Moreover, the second sensing element 13 captures the scene of the plate body 11 to acquire the second image T2 including the circle image. In case that the touching object 10 is closer to the first sensing element 12, the first size P1 of the circle image of the first image T1 is larger than the second size P2 of the circle image of the second image T2.

Then, the first predetermined position characteristic value is calculated according to the following mathematic formula: first predetermined position characteristic value=first size P1/((X-axis scale of the coordinate+1)×(Y-axis scale of the coordinate+1)). For example, the first predetermined position characteristic value corresponding to the first coordinate (0, 0) is P1, the first predetermined position characteristic value corresponding to the first coordinate (1, 0) is P1/2, the first predetermined position characteristic value corresponding to the first coordinate (2, 0) is P1/3, and the rest may be deduced by analogy. The plural first predetermined position characteristic values obtained according to the above mathematic formula are shown in FIG. 2.

Then, the second predetermined position characteristic value is calculated according to the following mathematic formula: second predetermined position characteristic value=second size P2/((X-axis scale of the coordinate+1)× (Y-axis scale of the coordinate+1)). For example, the second predetermined position characteristic value corresponding to the second coordinate (0, 0) is P2, the second predetermined position characteristic value corresponding to the first coordinate (1, 0) is P2/2, the first predetermined position characteristic value corresponding to the first coordinate (2, 0) is P2/3, and the rest may be deduced by analogy. The plural second predetermined position characteristic values obtained according to the above mathematic formula are shown in FIG. 3. The mathematic formula for obtaining the first predetermined position characteristic values and the mathematic formula for obtaining the second predetermined position characteristic values are empirical formulae.

After the first predetermined position characteristic values and the second predetermined position characteristic values are obtained according to calculation, these values are stored in the database 141 of the control unit 14. Moreover, the first object information corresponding to the touching object 10, the first size P1 corresponding to the touching object 10 (i.e., the size of the circle image with respect to the first sensing element 12) and the second size P2 corresponding to the touching object 10 (i.e., the size of the circle image with respect to the second sensing element 13) are also stored in the database 141.

Figure 4A:
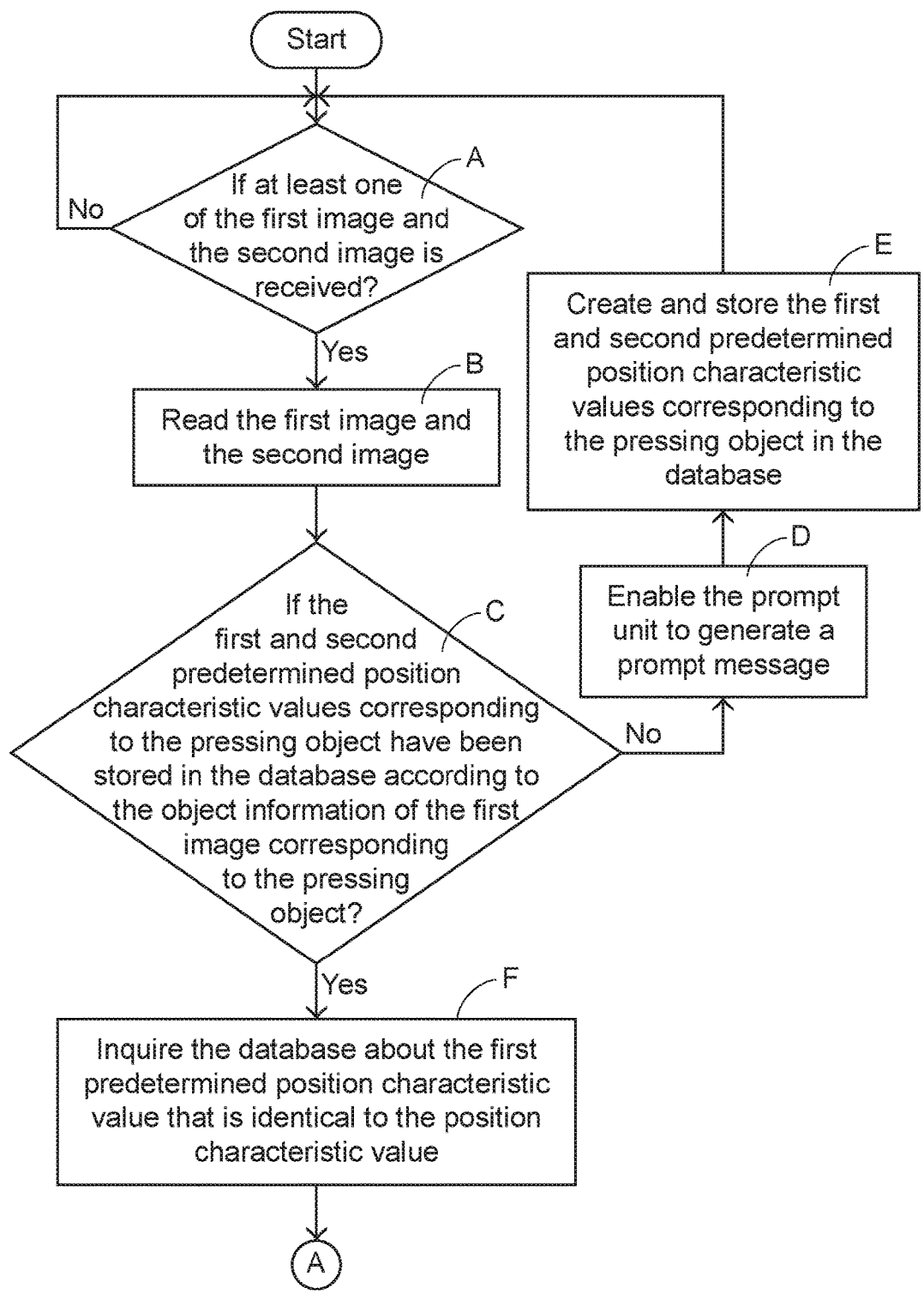
FIGS. 4A and 4B illustrate a flowchart of a control method of the control unit of the input device according to an embodiment of the present invention.
Figure 4B:
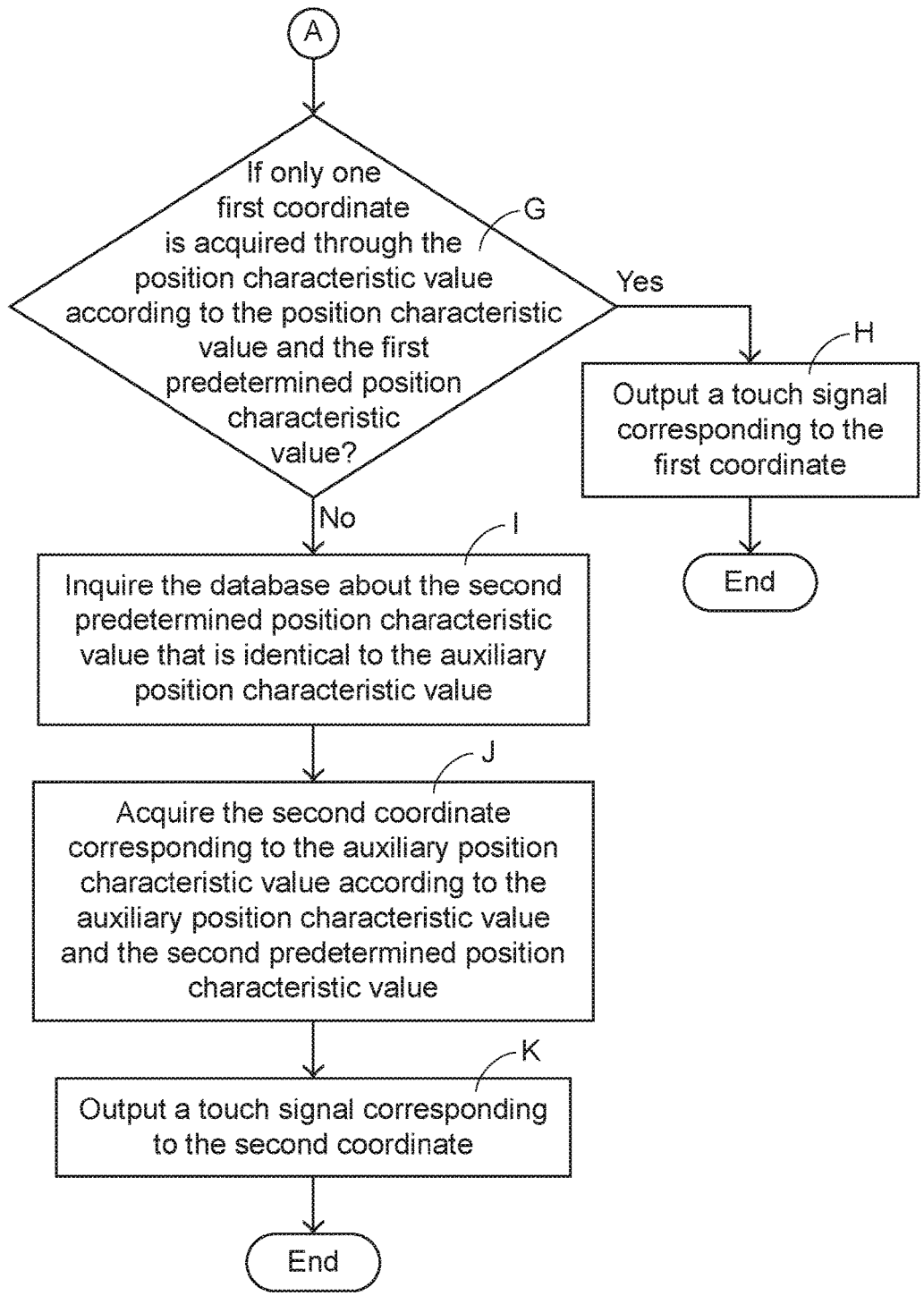

Hereinafter, the operations of the control unit 14 will be illustrated with reference to FIGS. 4A and 4B. FIGS. 4A and 4B illustrate a flowchart of a control method of the control unit of the input device according to an embodiment of the present invention. The control method includes the following steps.

In a step A, the control unit detects whether at least one of the first image and the second image is received.

In a step B, the first image and the second image are read.

In a step C, the control unit judges whether the first predetermined position characteristic values and the second predetermined position characteristic values corresponding to the touching object have been stored in the database according to the object information of the first image corresponding to the touching object.

In a step D, the prompt unit is enabled to generate a prompt message.

In a step E, the first predetermined position characteristic values and the second predetermined position characteristic values corresponding to the touching object are created and stored in the database.

In a step F: the control unit inquires the database about the first predetermined position characteristic value that is identical to the position characteristic value.

In a step G, the control unit judges whether only one first coordinate is acquired through the position characteristic value according to the position characteristic value and the first predetermined position characteristic value.

In a step H, a touch signal corresponding to the first coordinate is outputted.

In a step I: the control unit inquires the database about the second predetermined position characteristic value that is identical to the auxiliary position characteristic value.

In a step J, the second coordinate corresponding to the auxiliary position characteristic value is acquired according to the auxiliary position characteristic value and the second predetermined position characteristic value.

In a step K, a touch signal corresponding to the second coordinate is outputted.

If at least one of the first image and the second image is not received in the step A, the step A is repeatedly done at a specified time interval. Whereas, if the at least one of the first image and the second image is received in the step A, the step B is performed. If the control unit judges whether none of the first and second predetermined position characteristic values corresponding to the touching object have been stored in the database in the step C, the step D is performed. Whereas, if the control unit judges whether the first and second predetermined position characteristic values corresponding to the touching object have been stored in the database in the step C, the step F is performed. If the control unit judges that only one first coordinate is acquired through the position characteristic value in the step G, the step I is performed. Whereas, if the control unit judges that not only first coordinate is acquired through the position characteristic value in the step G, the step H is performed.

Figure 5:
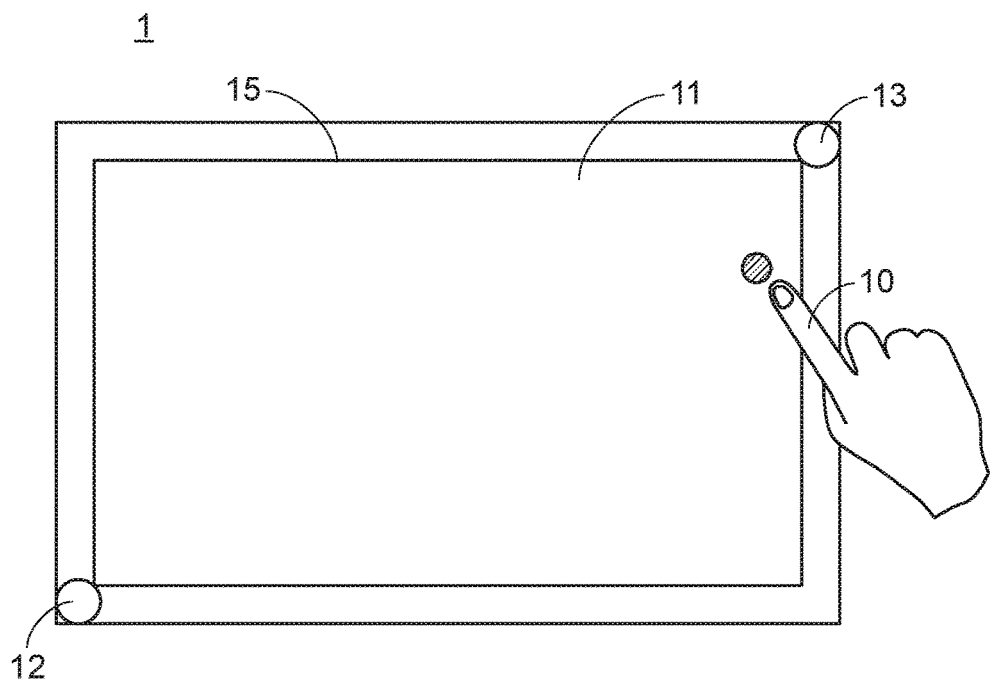
FIG. 5 schematically illustrates the use of the pressing object to operate the input device according to an embodiment of the present invention.

FIG. 5 schematically illustrates the use of the touching object to operate the input device according to an embodiment of the present invention. The detailed procedures of operating the input device 1 through the touching object 10 will be illustrated with reference to FIGS. 1~5. Firstly, the input device 1 is turned on. Then, the control unit 14 performs the step A of detecting whether at least one of the first image T1 and the second image T2 is received. If the first image T1 and the second image T2 are not received, the step A is repeatedly done at a specified time interval (e.g., 10 milliseconds). If the user moves the touching object 10 to a position over the plate body 11 and the touching object 10 is not contacted with the plate body 11, the first sensing element 12 can still detect the plate body 11 and the shadow of the touching object 10 on the plate body 11. Consequently, the first image T1 including the image of the touching object 10 (i.e., the shadow of the touching object 10) is captured by the first sensing element 12, and the first image T1 is transmitted to the control unit 14. At the same time, the second sensing element 13 also detects the plate body 11 and the shadow of the touching object 10 on the plate body 11. Consequently, the second image T2 including the image of the touching object 10 (i.e., the shadow of the touching object 10) is captured by the second sensing element 13, and the second image T2 is transmitted to the control unit 14.

Then, the control unit 14 performs the step B. That is, the control unit 14 analyzes the circle image of the first image T1 and the circle image of the second image T2. Moreover, the control unit 14 acquires the first object information corresponding to the touching object 10, the first size P1 corresponding to the circle image and the position characteristic value corresponding to the touching object 10 (e.g., P1/40) according to the first image T1, and the control unit 14 acquires the first object information corresponding to the touching object 10, the second size P2 corresponding to the circle image and the auxiliary position characteristic value corresponding to the touching object 10 (e.g., P2/2) according to the second image T2. Both of the first size P1 and the second size P2 are the diameters or areas of the circle images. Moreover, the first size P1 is smaller than the second size P2. That is, the second sensing element 13 is closer to the touching object 10 than the first sensing element 12.

After the step B is completed, the control unit 14 judges that the first predetermined position characteristic values and the second predetermined position characteristic values corresponding to the touching object 10 have been stored in the database 141 (Step C). Then, the control unit 14 performs the step F of inquiring the database 141 about plural first predetermined position characteristic values identical to the position characteristic value (i.e., P1/40). The number of the first predetermined position characteristic value identical to the position characteristic value is 1. The first predetermined position characteristic value corresponds to the first coordinate (7, 4). Consequently, in the step the control unit 14 judges that only one first coordinate is acquired through the position characteristic value. Then, in the step H, the control unit 14 outputs a touch signal corresponding to the first coordinate (7, 4). Meanwhile, the procedures of operating the input device 1 through the touching object 10 are completed. The operations in response to the touch signal and the types of the touch signal are well known to those skilled in the art, and are not redundantly described herein.

Especially, by using the above operating procedures, the input device 1 of the present invention can be used to perform a non-contact touch operation on the plate body 11 that is not a touch pad. It is noted that the touch operation is not restricted to the non-contact touch operation. In another embodiment, the input device 1 of the present invention can be used to perform a touch operation on the plate body 11 while contacting the touching object 10 with the plate body 11 (i.e., contacting the touching object 10 with the top surface of the plate body 11). The contact-type touch operation is similar to the non-contact touch operation, and is not redundantly described herein. That is, the input device 1 of the present invention can be used to perform the contact-type touch operation and the non-contact touch operation.

Figure 6:
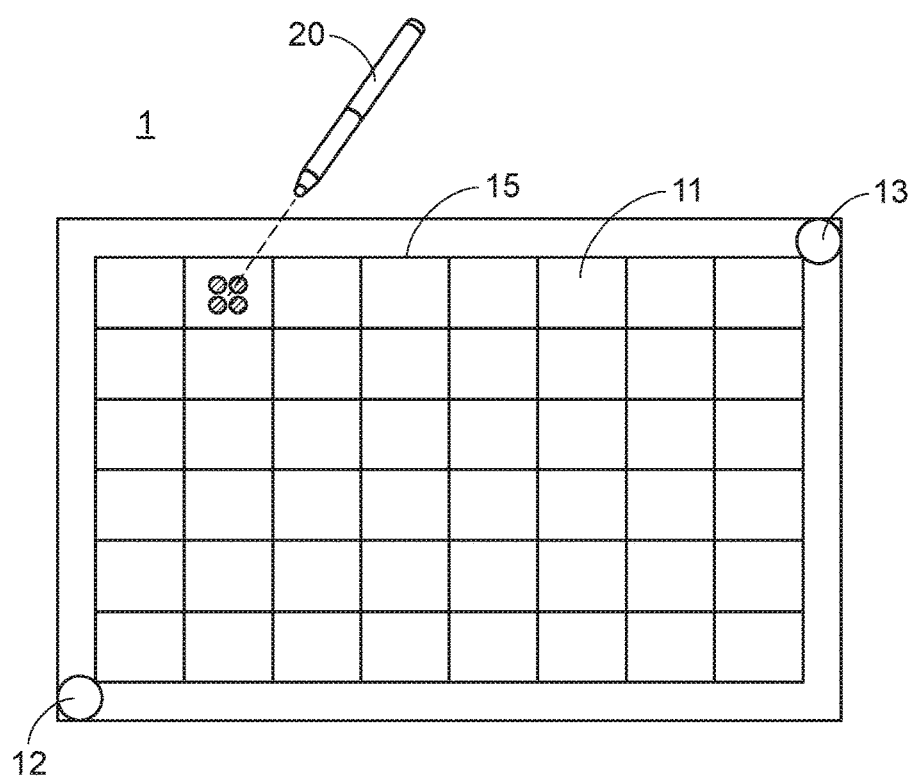
FIG. 6 schematically illustrates the use of another pressing object to operate the input device according to an embodiment of the present invention.

FIG. 6 schematically illustrates the use of another touching object to operate the input device according to an embodiment of the present invention. The detailed procedures of operating the input device 1 through the touching object 20 will be illustrated with reference to FIGS. 1~4 and FIG. 6. In this embodiment, the touching object 20 is a touch pen with an illuminating function. Firstly, the touching object 20 is moved to a position over the plate body 11, and at least one light spot from the touching object 20 is projected on the plate body 11. In the step A, the first sensing element 12 can detect the plate body 11 and the image of the at least one light spot on the plate body 11. Consequently, a third image T3 including the image corresponding to the touching object 20 is captured by the first sensing element 12, and the third image T3 is transmitted to the control unit 14. At the same time, the second sensing element 13 also detects the at least one light spot from the touching object 20. Consequently, a fourth image T4 including the image corresponding to the touching object 20 is captured by the second sensing element 13, and the fourth image T4 is transmitted to the control unit 14.

Then, the control unit 14 performs the step B. That is, the control unit 14 analyzes the image of the at least one light spot of the third image T3 and the fourth image T4. Moreover, the control unit 14 acquires a second object information corresponding to the touching object 20, a third size P3 corresponding to the image of the at least one light spot and the position characteristic value corresponding to the touching object 20 (e.g., P3/12) according to the third image T3, and the control unit 14 acquires the second object information corresponding to the touching object 20, a fourth size P4 corresponding to the image of the at least one light spot and the auxiliary position characteristic value corresponding to the touching object 20 (e.g., P4/20) according to the fourth image T4. Both of the third size P3 and the fourth size P4 are the diameters or areas of the image of the at least one light spot. Moreover, the third size P3 is larger than the fourth size P4. That is, the first sensing element 12 is closer to the touching object 20 than the second sensing element 13.

In the step C, the control unit 14 judges that none of the first predetermined position characteristic values, the second predetermined position characteristic values and the object information corresponding to the touching object 20 have been stored in the database 141.

Figure 7:
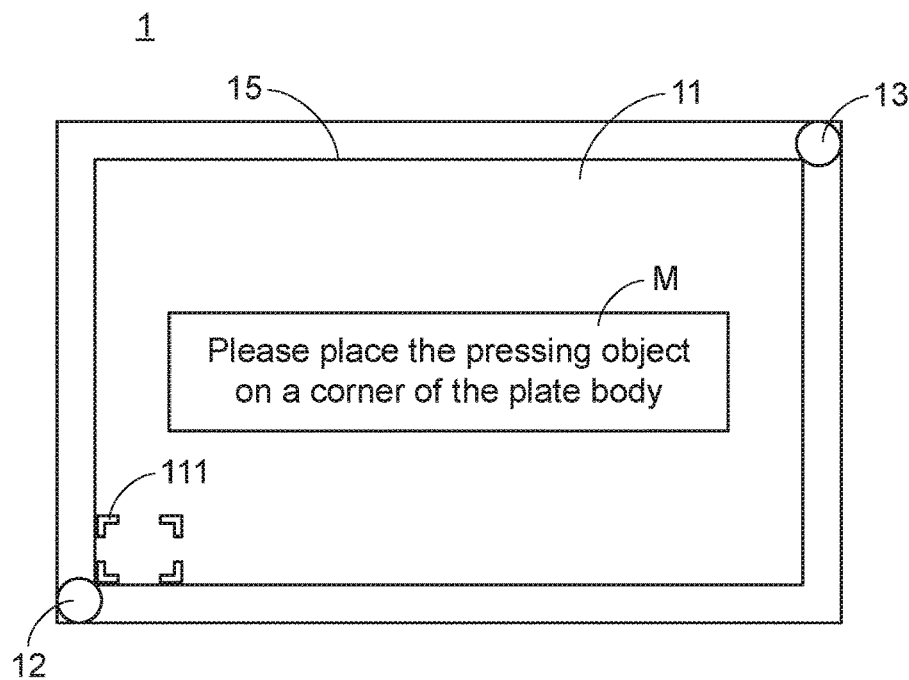
FIG. 7 schematically illustrates the contents of the plate body of the input device when the prompt unit is enabled.

Consequently, the control unit 14 performs the step D. After the prompt unit 15 is enabled, the prompt unit 15 generates a prompt message M. In this embodiment, the content of the prompt message M is "Please place the touching object on a corner of the plate body". In an embodiment, the plate body 11 is a display panel, and a placement mark 111 is shown on a corner of the plate body 11 for guiding the user. The contents of the plate body 11 when the prompt unit is enabled are shown in FIG. 7. As shown in FIG. 7, the corner of the plate body 11 is equivalent to the position of the first coordinate (0, 0). It is noted that the position for placing the touching object is not restricted to the corner of the plate body. That is, the touching object (e.g., the touching object 20) can be placed on/over any position of the plate body 11 as long as the touching object is detected by the first sensing element 12 or the second sensing element 13. Moreover, for creating the database 114 in the subsequent process, the position for placing the touching object must be the known first coordinate or the known second coordinate.

In response to the prompt message M, the touching object 20 is moved to the position over the placement mark 111, at least one light spot from the touching object 20 is projected on the position of the placement mark 111. Consequently, a new third image T3 including the image corresponding to the touching object 20 is detected and captured by the first sensing element 12, and the new third image T3 is transmitted to the control unit 14. Similarly, a new fourth image T4 including the image corresponding to the touching object 20 is detected and captured by the second sensing element 13, and the new fourth image T4 is transmitted to the control unit 14. Then, the control unit 14 performs the step E of creating and storing the first predetermined position characteristic values and the second predetermined position characteristic values corresponding to the touching object 20 in the database 141. The detailed procedure of the step E will be described as follows. The control unit 14 acquires the second object information corresponding to the touching object 20, the third size P3 corresponding to the image of the at least one light spot and the position characteristic value of the touching object 20 corresponding to the first coordinate (0, 0) (e.g., P3) according to the third image T3. Then, the position characteristic value P3 is stored as the first predetermined position characteristic value corresponding to the first coordinate (0, 0) by the control unit 14. Then, all of the first predetermined position characteristic values are calculated according to the following mathematic formula: first predetermined position characteristic value=third size P3/((X-axis scale of the coordinate+1)×(Y-axis scale of the coordinate+1)).

Similarly, the control unit 14 acquires the second object information corresponding to the touching object 20, the fourth size P4 corresponding to the image of the at least one light spot and the position characteristic value of the touching object 20 corresponding to the second coordinate (7, 5) (e.g., P4/48) according to the fourth image T4. Then, the position characteristic value P4/48 is stored as the second predetermined position characteristic value corresponding to the second coordinate (7, 5) by the control unit 14. Then, all of the second predetermined position characteristic values are calculated according to the following mathematic formula: second predetermined position characteristic value=fourth size P4/((X-axis scale of the coordinate+1)×(Y-axis scale of the coordinate+1)). The mathematic formula for obtaining the third predetermined position characteristic values and the mathematic formula for obtaining the fourth predetermined position characteristic values are empirical formulae.

Figure 8:
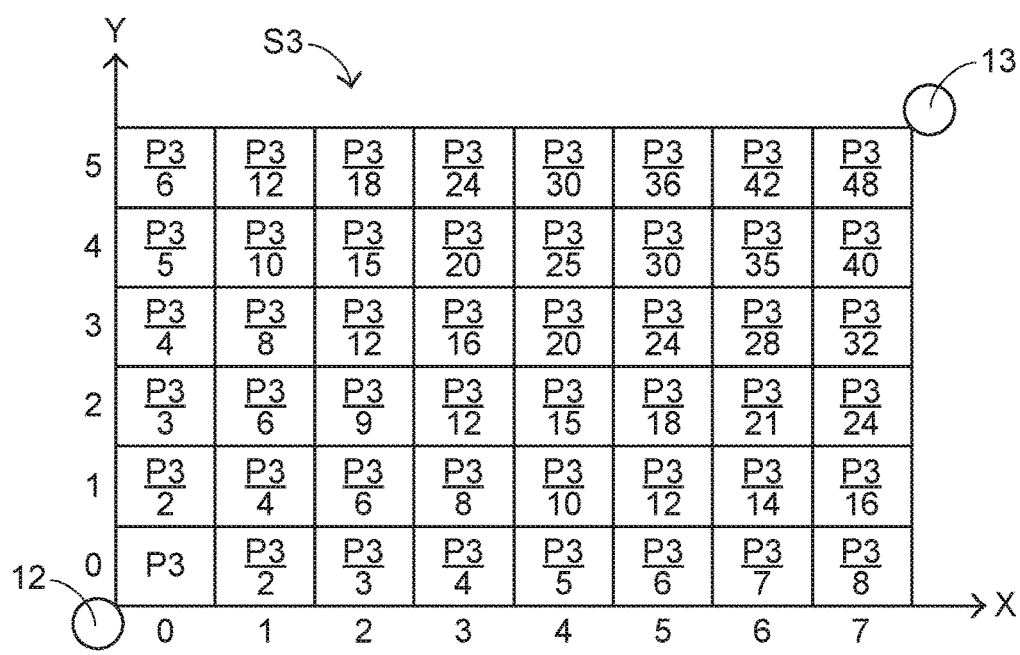
FIG. 8 schematically illustrates a third coordinate system of the input device according to an embodiment of the present invention.

After all of the first predetermined position characteristic values and the second predetermined position characteristic values are obtained according to calculation, these values are stored in the database 141. Meanwhile, the database 141 is created. That is, a third coordinate system S3 and a fourth coordinate system S4 corresponding to the touching object 20 and shown in FIGS. 8 and 9 are created in the database 141. Then, the step A is performed by the control unit 14 again.

Then, the touching object 20 is moved to a position over the plate body 11, and at least one light spot from the touching object 20 is projected on the plate body 11. Then, the above steps A, B and C are performed by the input device 1. Consequently, the third image T3 and the fourth image T4 are acquired by the control unit 14. For example, the position characteristic value corresponding to the touching object 20 is P3/12 according to the third image T3, and the auxiliary position characteristic value corresponding to the touching object 20 is P4/7 according to the fourth image T4. In the step C, the control unit 14 judges that the first predetermined position characteristic values and the second predetermined position characteristic values corresponding to the touching object 20 have been stored in the database 141. Then, the control unit 14 performs the step F of inquiring the database 141 about plural first predetermined position characteristic values identical to the position characteristic value. In the step F, the number of the inquired first predetermined position characteristic values identical to the position characteristic value (i.e., P3/12) is 4. The four first predetermined position characteristic values correspond to four first coordinates (1, 5), (2, 3), (3, 2) and (5, 1). Consequently, in the step G, the control unit 14 judges that not only one first coordinate is acquired through the position characteristic value according to the position characteristic value and the first predetermined position characteristic values. Then, the control unit 14 performs the step I of inquiring the database 141 about the second predetermined position characteristic value that is identical to the auxiliary position characteristic value (i.e., P4/7). Consequently, in the step J, only one second predetermined position characteristic value corresponding to the second coordinate (6, 0) is acquired. Then, in the step K, the control unit 14 outputs a touch signal corresponding to the second coordinate (6, 0). Meanwhile, the procedures of operating the input device 1 through the touching object 20 are completed.

The position of the plate body 11 corresponding to the second coordinate (6, 0) is identical to the position of the plate body 11 corresponding to the first coordinate (1, 5) of the first coordinate system S1. Consequently, according to the second coordinate (6, 0), the control unit 14 confirms that the image of the at least one light spot of the touching object 20 is located at the position corresponding to the first coordinate (1, 5). Under this circumstance, the possibility of misjudging the position of the touching object 20 is minimized.

From the above descriptions, the input device of the present invention uses two sensing elements to establish two coordinate systems on the plate body. Moreover, the second coordinate system can assist the control unit in recognizing the position of the first coordinate of the first coordinate system. Consequently, the possibility of misjudging the position of the touching object is minimized. In comparison with the conventional input device using plural high-density sensing lines, the input device of the present invention has reduced fabricating cost and still has the desired precision of recognizing the position of the touching object. Moreover, even if the plate body has no touch control function, the input device of the present invention can be used to perform the contact-type touch operation and the non-contact touch operation.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An input device, comprising:
    a plate body;
    a first sensing element disposed on the plate body and located at a first end of a diagonal of the plate body, wherein the first sensing element detects a first image corresponding to a touching object on or over the plate body;
    a second sensing element disposed on the plate body and located at a second end of the diagonal of the plate body, wherein the second sensing element detects a second image corresponding to the touching object on/over the plate body; and
    a control unit electrically connected with the first sensing element and the second sensing element, wherein the control unit acquires a position characteristic value according to the first image and acquires an auxiliary position characteristic value according to the second image, and the control units recognizes a position of the touching object according to the position characteristic value and the auxiliary position characteristic value and generates an output signal according to the position of the touching object, wherein the control unit defines plural first coordinates of the plate body, the plural first coordinates of the plate body are collaboratively formed as a first coordinate system with respect to the first sensing element, and the plural first coordinates of the plate body correspond to plural first predetermined position characteristic values, respectively, wherein the control unit defines plural second coordinates of the plate body, the plural second coordinates of the plate body are collaboratively formed as a second coordinate system with respect to the second sensing element, and the plural second coordinates of the plate body correspond to plural second predetermined position characteristic values, respectively, wherein the first image contains an object information corresponding to the touching object, a first size corresponding to the touching object and the position characteristic value corresponding to the touching object, and the second image contains the object information corresponding to the touching object, a second size corresponding to the touching object and the auxiliary position characteristic value corresponding to the touching object, wherein the control unit analyzes the second image to acquire the position characteristic value, and the control unit analyzes the second image to acquire the auxiliary position characteristic value, wherein each of the plural first predetermined position characteristic values is equal to the first size/((an X-axis scale of one of the plural first coordinates of the plate body+1)×(a Y-axis scale of one of the plural first coordinates of the plate body+1)), and each of the plural second predetermined position characteristic values is equal to the second size/((an X-axis scale of one of the plural second coordinates+1)×(a Y-axis scale of one of the plural second coordinates+1)).

2. The input device according to claim 1, wherein the control unit further comprises a database, wherein a first object information corresponding to the touching object, the first size, the plural first predetermined position characteristic values, the second size and the plural second predetermined position characteristic values are stored in the database.

3. The input device according to claim 2, wherein when the touching object is close to the plate body, the first sensing element senses the plate body to acquire the first image corresponding to the touching object, and the second sensing element senses the plate body to acquire the second image corresponding to the touching object, wherein according to the first image and the second image are acquired, the control unit acquires the position characteristic value and the auxiliary position characteristic value, and the control unit judges whether only one of the plural first coordinates of the plate body is acquired through the position characteristic value.

4. The input device according to claim 3, wherein when the control unit judges that only one of the plural first coordinates of the plate body is acquired through the position characteristic value, the control unit acquires the first coordinate corresponding to the position characteristic value according to the position characteristic value and the corresponding first predetermined position characteristic value, and the control unit generates the touch signal corresponding to the first coordinate, wherein when the control unit judges that not only one of the plural first coordinates of the plate body is acquired through the position characteristic value, the control unit acquires one of the plural second coordinates of the plate body corresponding to the auxiliary position characteristic value according to the auxiliary position characteristic value and the corresponding second predetermined position characteristic value, and the control unit generates the touch signal corresponding to the second coordinate.

5. The input device according to claim 4, wherein the control unit judges whether only one of the plural first coordinates of the plate body is acquired according to a number of the first predetermined position characteristic value identical to the position characteristic value, wherein when the number of the first predetermined position characteristic value identical to the position characteristic value is equal to 1, the control unit judges that only one of the plural first coordinates of the plate body is acquired, wherein when the number of the first predetermined position characteristic value identical to the position characteristic value is larger than 1, the control unit judges that not only one of the plural first coordinates of the plate body is acquired.

6. The input device according to claim 2, wherein when a third image corresponding to a second touching object on or over the plate body is detected by the first sensing element, the control unit further judges whether a second object information corresponding to the second touching object has been included in the database, wherein when the control unit judges that the second object information has been included in the database, the control unit retrieves the first predetermined position characteristic value and the second predetermined position characteristic value corresponding to the second touching object, wherein when the control unit judges that the second object information has not been included in the database, the first predetermined position characteristic values and the plural second predetermined position characteristic values corresponding to the second touching object are created and stored in the database by the control unit.

7. The input device according to claim 6, wherein when the control unit judges that the object information corresponding to the second touching object is not included in the database, the control unit controls a prompt unit to generate a prompt message to indicate a reference position of the plate body where the second touching object is placed.

8. The input device according to claim 7, wherein the prompt unit is a built-in display device or a built-in sound output device that is disposed within the input device, or the prompt unit is an external display device or an external sound output device that is connected with the input device.

* * * * *